(12) United States Patent
Mashevsky et al.

(10) Patent No.: US 8,479,296 B2
(45) Date of Patent: Jul. 2, 2013

(54) SYSTEM AND METHOD FOR DETECTING UNKNOWN MALWARE

(75) Inventors: Yury V. Mashevsky, Moscow (RU); Roman S. Vasilenko, St. Petersburg (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/190,601

(22) Filed: Jul. 26, 2011

(65) Prior Publication Data

US 2012/0174227 A1   Jul. 5, 2012

(30) Foreign Application Priority Data

Dec. 30, 2010   (RU) ................................ 2010154528

(51) Int. Cl.
*G06F 12/14*   (2006.01)

(52) U.S. Cl.
USPC .................... 726/24; 726/22; 726/23; 726/25

(58) Field of Classification Search
None
See application file for complete search history.

(56) References Cited

U.S. PATENT DOCUMENTS

| | | | |
|---|---|---|---|
| 5,440,742 A | 8/1995 | Schwanke | |
| 6,357,008 B1 * | 3/2002 | Nachenberg | 726/24 |
| 7,093,239 B1 | 8/2006 | van der Made | |
| 7,478,431 B1 * | 1/2009 | Nachenberg | 726/24 |
| 7,530,106 B1 | 5/2009 | Zaitsev et al. | |
| 7,624,448 B2 * | 11/2009 | Coffman | 726/23 |
| 7,707,634 B2 * | 4/2010 | Sandu et al. | 726/24 |
| 7,913,305 B2 | 3/2011 | Bodorin et al. | |
| 7,917,481 B1 * | 3/2011 | Kale et al. | 707/693 |
| 7,925,874 B1 | 4/2011 | Zaitsev | |
| 8,010,614 B1 * | 8/2011 | Musat et al. | 709/206 |
| 2005/0086499 A1 * | 4/2005 | Hoefelmeyer et al. | 713/188 |
| 2005/0223238 A1 | 10/2005 | Schmid et al. | |
| 2006/0212941 A1 * | 9/2006 | Bronnikov et al. | 726/24 |
| 2007/0094734 A1 | 4/2007 | Mangione-Smith et al. | |
| 2007/0136455 A1 | 6/2007 | Lee et al. | |
| 2007/0240215 A1 | 10/2007 | Flores et al. | |
| 2007/0240222 A1 * | 10/2007 | Tuvell et al. | 726/24 |
| 2008/0047009 A1 * | 2/2008 | Overcash et al. | 726/23 |
| 2008/0263669 A1 * | 10/2008 | Alme | 726/24 |
| 2009/0031001 A1 | 1/2009 | Archer et al. | |
| 2009/0282393 A1 * | 11/2009 | Costa et al. | 717/132 |
| 2009/0287653 A1 * | 11/2009 | Bennett | 707/3 |
| 2009/0307771 A1 * | 12/2009 | Rajan et al. | 726/22 |
| 2010/0146624 A1 * | 6/2010 | Meyer et al. | 726/23 |
| 2010/0235918 A1 * | 9/2010 | Mizrahi et al. | 726/25 |
| 2010/0281248 A1 * | 11/2010 | Lockhart et al. | 713/150 |
| 2011/0219450 A1 * | 9/2011 | McDougal et al. | 726/23 |
| 2012/0102568 A1 * | 4/2012 | Tarbotton et al. | 726/23 |

* cited by examiner

*Primary Examiner* — Jung Kim
*Assistant Examiner* — Adrian Stoica
(74) *Attorney, Agent, or Firm* — Arent Fox LLP; Michael Fainberg

(57) ABSTRACT

The present disclosure relates generally to the field of computer security and, in particular, to systems for detecting unknown malware. A method comprises generating genes for known malicious and clean objects; analyzing object genes using different malware analysis methods; computing a level of successful detection of malicious objects by one or a combination of malware analysis methods based on analysis of genes of the known malicious objects; computing a level of false positive detections of malicious objects by one or a combination of malware analysis methods based on analysis of genes of known clean objects; measuring effectiveness of each one or the combination of malware analysis methods as a function of the level of successful detections and the level of false positive detections; and selecting one or a combination of the most effective malware analysis methods for analyzing unknown object for malware.

18 Claims, 15 Drawing Sheets

| List of Computers | Productivity Level | Network Accessibility Level |
|---|---|---|
| Computer 1 | High | Low |
| Computer 2 | Medium | Low |
| Computer 3 | Medium | Medium |
| ... | ... | ... |
| Computer N | Low | Medium |

Fig. 4

| Object Type / List of Combinations | Object Type 1 | Object Type 2 | ... | Object Type N |
|---|---|---|---|---|
| Combination 1 | $K_{11}$ | $K_{12}$ | ... | $K_{1N}$ |
| Combination 2 | $K_{21}$ | $K_{22}$ | ... | $K_{2N}$ |
| Combination 3 | $K_{31}$ | $K_{32}$ | ... | $K_{3N}$ |
| ... | ... | ... | ... | ... |

Fig. 12

| Code portions of Trojan.Win32.Oqad.h | Code portions of Trojan.Win32.Oqad |
|---|---|
| http://www.wz1122.com/taobao1.html | http://www.game1122.com/?new |
| Internet Explorer.jzmm | Internet Explorer.jdmm |
| Internet Explorer.jzmm | Internet Explorer.jdmm |
| c:\fiwefwafafi.log | c:\aaaa.log |
| c:\fewfwesss.log | c:\filefi.log |
| c:\aaaa.log | {FBF23B40-E3F0-101B-8488- 00AA003E56F8} |
| {3AFAC3E1-F7B9-48F1-9D8F- 8274EB4AAFA8} | c:\file.log |
| c:\aafef.log | c:\fewd.log |

Fig. 13A

| Order of API-Function calls for Trojan-Downloader.Win32.CodecPack.ofo | | Order of API-Function calls for Trojan-Downloader.Win32.CodecPack.oel | |
|---|---|---|---|
| 004016AC | GetACP | 0040812B | lstrlen |
| 00401739 | GetACP | 00408193 | lstrlen |
| 00401796 | GetACP | 0040820E | GetACP |
| 004017F8 | GetACP | 0040827B | GetACP |
| 00401862 | GetACP | 004082E1 | GetACP |
| 004018B8 | GetACP | 00408345 | lstrlen |
| 00401917 | GetACP | 004083AE | GetACP |
| 0040197A | lstrlen | 0040840C | GetACP |
| 004019E0 | GetACP | 00408470 | lstrlen |
| 00401A50 | lstrlen | 004084CC | GetACP |
| 00401AB5 | GetACP | 00408544 | lstrlen |
| 00401B13 | lstrlen | 004085B4 | lstrlen |
| 00401B82 | GetACP | 00408621 | GetACP |
| 00401BE8 | GetACP | 00408698 | lstrlen |
| 00401C52 | GetACP | 004086F9 | lstrlen |
| 00401CB5 | GetACP | 00408766 | lstrlen |
| 00401D2D | lstrlen | 004087D7 | lstrlen |
| 00401D9F | GetACP | 00408845 | lstrlen |
| 00401E0E | lstrlen | 004088B1 | lstrlen |
| 00401E85 | GetACP | | |
| 00401EF6 | lstrlen | | |
| 00401F67 | lstrlen | | |
| 00401FD6 | GetACP | | |

Fig. 13B

SYSTEM AND METHOD FOR DETECTING UNKNOWN MALWARE

TECHNICAL FIELD

The present disclosure relates generally to the field of computer security and, in particular, to systems for detecting unknown malware.

BACKGROUND

At the present time there are several methods which antivirus software can use to identify malware: signature matching methods, heuristic analysis, etc. These methods are useful to malware detection if the mal ware growth is not aggressive and antivirus companies an make necessary updates for antivirus systems.

The significant growth in the number of Internet users in the past decade fueled by the advances in Internet services, such as gaming, news, entertainment, shopping, banking, social networking, etc., has led to significant increase in emergence of new types of malware. The number of new malicious programs being detected has increased more than tenfold in the last three years alone. And the rate of growth continues to increase. Thus, antivirus software developers have been working hard to keep up with the proliferation of new kinds of malware by developing new methods and systems for detection of malicious software.

As a result of this development, techniques of signature matching and heuristic analysis of malware have become widespread and most frequently used in antivirus applications and other computer and network security products. However, these techniques have limitations.

Signature matching methods are oriented exclusively towards the detection of known software objects and are poorly adapted in detection of previously unknown types of malware. This is associated with the fact that they are based on a comparison of the values of hash functions from small sections of a file. Thus, by virtue of the cryptographic properties of the hash functions, a change in even one bit in the input data completely changes the output result. Because of this insignificant mutation in malware object can make the object unknown for antivirus system. There are two main parameters which characterize an antivirus system. The first parameter is the detection rate of unknown malware. It is determined as the number of detected malware objects divided by the number of known malware objects. The second parameter is the false positive rate which is determined as the number of safe objects detected as malware objects divided by the number of all scanned safe objects.

Heuristic analysis methods of protection also have deficiencies in the detection of unknown malware: first, a longer operating time relative to the signature methods; and second, they are already close to the limit of their capabilities, providing a detection rate of 60-70%. Heuristic analysis methods are liable to false detection risks.

There are other methods of malware detection except described above. The method for detection malicious software by identifying malicious structural features, decryption code, and cryptographic functions is described in the U.S. Patent Application No. 20050223238 A1. A malicious structural feature is identified by comparing a known malicious structural feature to one or more instructions of the executable file. Deletion of is harmless code (for example. API-functions) performed to obtain unique structural feature which is only 10-20% of original code. The structural feature of the object is compared with malicious structural features to determine if the object is malicious.

Another way to determine malware is to compare functionality of the analyzed software with the malware functionality using a poi non of the execution path of the object (see FIG. 7).

FIG. 7 illustrates an example of a portion of the execution path of a worm program, i.e. computer program that replicates, but does not infect other files: instead, it installs itself on a victim computer and then looks for a way to spread to other computers (for more information, visit http://www.securelist.com/ru/glossary?glossid=152527951). The execution path of the worm program consists of network address of the computer system determination, establishment a connection with the computer system, and data transmission. Thus, it becomes clear from the execution path of the program what functions and with what parameters are being called out during program execution, which turns out to be useful for analysis of maliciousness of the program.

The analysis of program graphs can be also very useful to detect malicious object. The graph vertices are a set of assembler functions. Two vertices are connected by an edge when and only when there is a call from one of them to the other. There are two types of program graphs: a program flowchart of the object and a function call-graph of the object. FIG. 8 and FIG. 9 illustrate the program flowchart of the object and the function call-graph of the object accordingly. FIG. 8 illustrates an example program flowchart of a Trojan-horse program (for more information, visit http://www.securelist.com/ru/glossary?letter=244#gloss152528302). As shown, the vertices are a set of assembler functions executed before JMP instruction. FIG. 9 illustrates a portion of a function call-graph of a worm program. In this case, the vertices are certain procedures or functions of a high-level language. It is possible to separate from them standard or API-functions 920, as well as unique ones 910, which were written by the actual programmer for himself.

The program execution path method is described in the U.S. Patent Application Nos. 20070240215A1, 20070094734A1, and in the U.S. Pat. No. 7,093,239 B1. The patented method describes the program execution path which is formed during the start of the application. A drawback of the method is that it can be performed in virtual environment only that involves increasing the computer resource consumption. Malware detection process in the mentioned patent and patent applications is based on the resemblance determination procedure between the analyzed object and one or more malicious objects. To determine the resemblance between two objects some different approaches are used, for example, Levenshtein distance.

The U.S. Patent Application No. 20070136455A1 describes a method for classifying an application into an application group which is previously classified in a knowledge base. The U.S. Patent Application No. 20090631001 describes a method for detection, classification and reporting of malicious software based on analysis of the software activity log using the behavior patterns.

The known methods are yet not applicable with another types of objects, for instance, script files, documents etc. Another disadvantage is that some malicious objects can be detected as a suspicious object because of the distance between them exceeds the threshold value.

There is another problem connected with the response times to new threats. Sometimes antivirus system cannot detect if the object is malicious. In this case antivirus system sends information about the object (name, size, hash function, etc.) to the antivirus server. The response time depends on if there is such object on the antivirus server. The known antivirus systems determine malicious objects based on analysis of the entire object. The antivirus server receives thousands requests. To reduce the traffic it would be better to transmit the necessary information only but not entire objects.

The detection efficiency of existing methods directly depends on the absence of their vulnerability. If method is undisclosed there are almost no exploits that use its vulnerabilities. In future the vulnerabilities of the method will be revealed and using, of such method will not be so effective. There is an example of reducing efficiency of line-by-line comparison analysis for detection malware. After this analysis was explored the new types of malware appeared which used dynamic code generation and encryption. FIG. 13A illustrates an example of a modification of program code so that line-by-line comparison analysis would fail. Shown are two sets of code lines of two Trojan-horse programs, which have the same functionality, but different file names. Thus, both objects perform similar malicious actions, but when their code lines are compared for exact match, it is determined that practically all lines are different. Thus, if the exact line-by-line comparison does not give a positive result, approximate string matching may be used. FIG. 13B illustrates an example of code obfuscation that prevents detection of a malicious object using analysis of function call-graphs of the program. In the specified list of functions being called, criminals have included dummy code that does not affect the end result of the program. The direct comparison of the provided function call-graphs fails to identify the program as known malware because the function call-graphs are too dissimilar. Therefore such garbage instructions make the use of the call-graph analysis difficult for detecting unknown malware, and other malware analysis methods should be used.

Therefore, new methods for detection of unknown malware are necessary.

SUMMARY

The present invention intended for computer systems and, in particular, for detecting unknown malware.

The technical result is increasing efficiency of detecting unknown malware,

Disclosed are method, system, and the computer-readable storage medium comprising computer-executable instructions for detecting unknown malware. In one embodiment, a method for detecting unknown malware comprises: a) generating at least one object feature, wherein an object feature is data structure describing information associated with an object; b) analyzing each object feature using one or more malware analysis methods; c) computing a level of successful detection of malicious objects by one or a combination of two or more malware analysis methods; d) computing a level of false positive detections of malicious objects by one or a combination of two or more malware analysis methods; e) measuring effectiveness of each one or the combination of malware analysis methods as a function of the level of successful detections of the known malicious objects and the level of false positive detections of the known clean objects; f) selecting one or a combination of the most effective malware analysis methods; g) analyzing an unknown object for presence of malware using selected one or a combination of the most effective malware analysis methods.

In one embodiment, the object includes one or more of: an executable file, script, script file or document.

In another embodiment, the object feature includes one or more of operational areas of the object, unique lines of code of the object, sequences of API-functions requests, function call-graph of the object, and program flowchart.

In another embodiment, the object feature analysis is provided using full databases of known malware and clean objects or databases containing malware detected in the last month or day.

In another embodiment, all the disclosed steps of the method are repeated periodically to update information about efficiency of one or a combination of the malware analysis methods.

In another embodiment, the effectiveness measurement of each one or the combination of malware analysis methods is provided for selected type of the object.

In yet another embodiment, the level of successful detections of known malicious objects using a malware analysis method is defined as a ratio of a number of detected known malicious objects using said method and the total number of known malicious objects; and the level of false positive detections of known clean objects using a malware analysis method is defined as a ratio of a number of clean objects recognized as malicious using said method and the total number of known clean objects.

In another embodiment, the effectiveness is measured by combining at least two methods of malware analysis.

In one example embodiment, a system for detecting unknown malware, comprises: means for generating at least one object feature, wherein an object feature is a data structure describing information associated with an object; means for computing, a level of successful detection of malicious objects by one or a combination of two or more malware analysis methods; means for computing a level of false positive detections of malicious objects by one or combination of two or more malware analysis methods; means for measuring effectiveness of each one or the combination of malware analysis methods; means for selecting one or a combination of the most effective malware analysis methods, and databases of malware and clean objects.

In one example embodiment, the object includes one or more of an executable file, script, script file or document.

In another example embodiment, the object feature includes one or more of operational areas of the object, unique lines of code of the object, sequences of API-functions requests, function call-graph of the object, and program flowchart.

In another embodiment, the databases of known malware and clean objects contain entries for all known malware or malware detected in the last month or day.

In another embodiment, determined type objects are analyzed to measure the effectiveness of each one or the combination of malware analysis methods provided for determined type of the object, for example, executable files, documents, etc.

In another embodiment, disclosed, system additionally contains means for combining malware analysis methods wherein the effectiveness is measured by combining at least two methods of malware analysis.

In one embodiment, the computer-readable storage medium containing computer-executable instructions for detecting unknown malware comprises instructions for: generating at least one object feature, wherein, an object feature is a data structure describing information associated with an object; analyzing each object feature using one or more malware analysis methods; computing a level of successful detection of malicious objects by one or a combination of two or more malware analysis methods; computing a level of false positive detections of malicious objects by one or a combination of two or more malware analysis methods; measuring the effectiveness of each one or the combination of malware analysis methods and selecting one or a combination of the most effective malware analysis methods analyzing an unknown object for presence of mal ware using selected analysis methods.

The sole purpose of the summary is to preset one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings illustrate one or more example embodiments of the invention and, together with the detailed description serve to explain their principles and implementations.

In the drawings:

FIG. 4 illustrates a table for selecting a computer system for analysis of unknown objects for presence of malware according to one example embodiment.

FIG. 12 illustrates a table for evaluating the effectiveness of malware analysis methods according to one example embodiment.

FIG. 13A illustrates an example of a modification of program code so that line-by-line comparison analysis would fail.

FIG. 13B illustrates a method of counteracting the analysis of a function call graph by adding dummy instructions.

DETAILED DESCRIPTION OF EXAMPLE EMBODIMENTS

Example embodiments of the present invention are described herein in the context of systems, methods and computer program products for detecting unknown malicious objects. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 10:
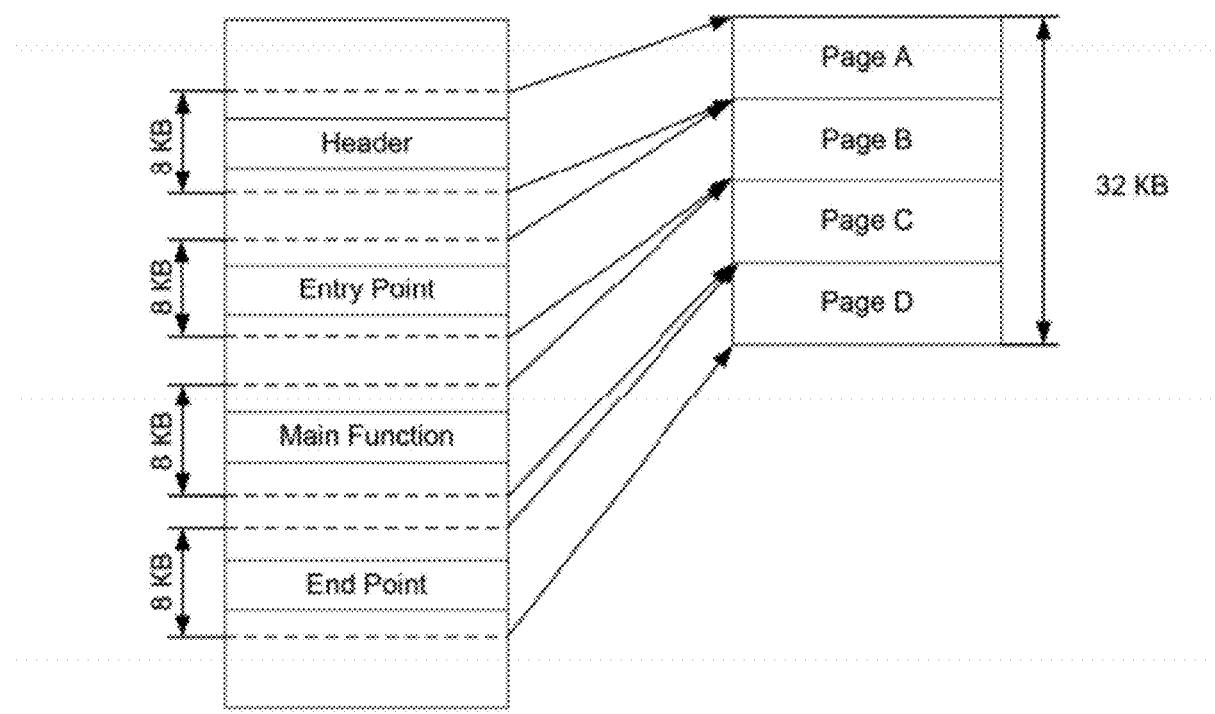
FIG. 10 illustrates an example of an operational area of an executable file.

In one example embodiment, a concept of "object genome" is used for description of software objects, adaptive selection of a method for analysis of software objects, and detection of malicious object. A software object as used herein includes files of different format, such as executable files, scripts, documents, libraries, and other types of executable code or data. An object genome is a data structure containing a set of characteristics, each of which in a general form describes a software object in such a way that it is possible to determine its affinity to one of the classes. In one example embodiment, the object genome consists of a set of so-called "genes" (by analogy with biology), whereby the gene is an analogue of the characteristic of the object. Hereinafter, for simplicity, we shall use the term "gene". In particular, an object gene may be defined as a data structure containing a plurality of different information elements of the object being studied, including, but not limited to, unique lines of code of the object, its operational areas, program execution path, behavior patterns, program flowcharts, operating system API call-graphs, and other types of information. Different types of objects may have different genes and different genes may include different information elements extracted from the object. Different genes are analyzed in different ways. For example, callgraphs are analyzed by comparing them to those in the databases. In another example, operational area gene may include portions of a file that are loaded into random access memory during file execution. FIG. 10 shows one example for obtaining the operational areas of an executable file being used in the environment of operating systems in the Windows family. Such files are called portable executable (PE) files (for more information, visit http://www.microsoft.com/whdc/system/platform/firmware/PECOFF.mspx). These types of files have specific structure, namely, a header, a set of sections, import tables, relocation tables, etc. Thus, an operational area gene for this kind of file may include the most important elements of the file, including its header, entry point, a pointer to the main function, and other service areas. FIG. 10 shows only one embodiment for obtaining the operational areas of an executable file. The most important elements of the executable file, including, the header of the file, the random access memory pointer, the entry point, the end point, and the pointer to the main function are taken. Before and after each element the 4 KB of information is taken. In this way, 32 KB of information is generated, which is stored in random access memory and used for further analysis. This approach minimizes the file analysis time since direct access to an object on the hard drive is a very slow operation in the computer, while working with random access memory is substantially faster.

Figure 11:
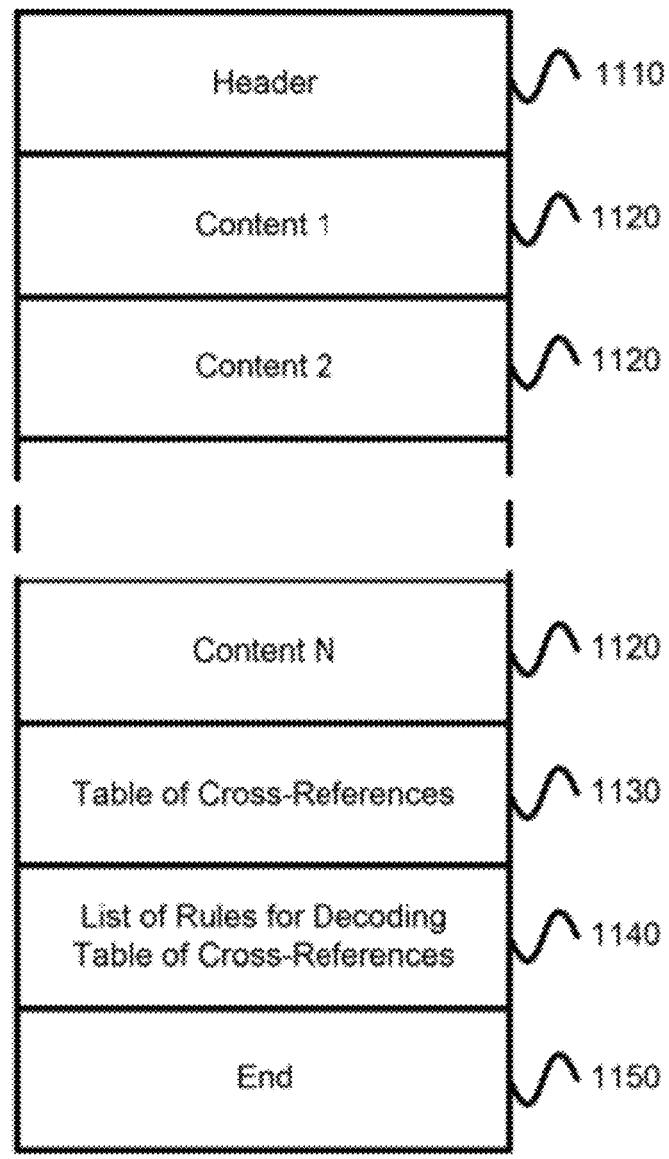
FIG. 11 illustrates schematically structure of a PDF file.

However, in the processing of files of a different format, such as, a portable document format (PDF), other portions of the file may be selected as operational areas. Therefore, operation area gene for this type of object will include different information elements from those used in PE files. In particular, in case of PDF files, file's active content, such as Java scripts (scripts written in Javascript language), may be considered as the most important information elements characterizing functionality of the file because execution of Javascript in the body of a document is not a secure operation, since scripts can call other executable files. Therefore, active content elements of this object may be included in the operation area gene. FIG. 11 shows a structure of the PDF file, which includes a plurality of active and passive content elements and a table of cross-references between these elements, and rules for decoding these elements.

Furthermore, different methods may be used for analyzing different object genes in order to determine if the objects are malicious or clean. For example, a function call-graph gene of an object may be analyzed by means of comparison with analogous function call-graphs of known malicious objects stored in a remote malware database. In one embodiment, genes for which the malware databases do not take up much space can be processed without requests to the remote database. In this case, the indicated databases may be transmitted to the appropriate analytical component, which may be a part of an antivirus application deployed on the user's computer. This analytical component would be able to compare function call-graph gene with the function call-graph of known malicious objects from the received databases directly on the user computer and render an appropriate decision as to whether the object is malicious or not.

Figure 1:
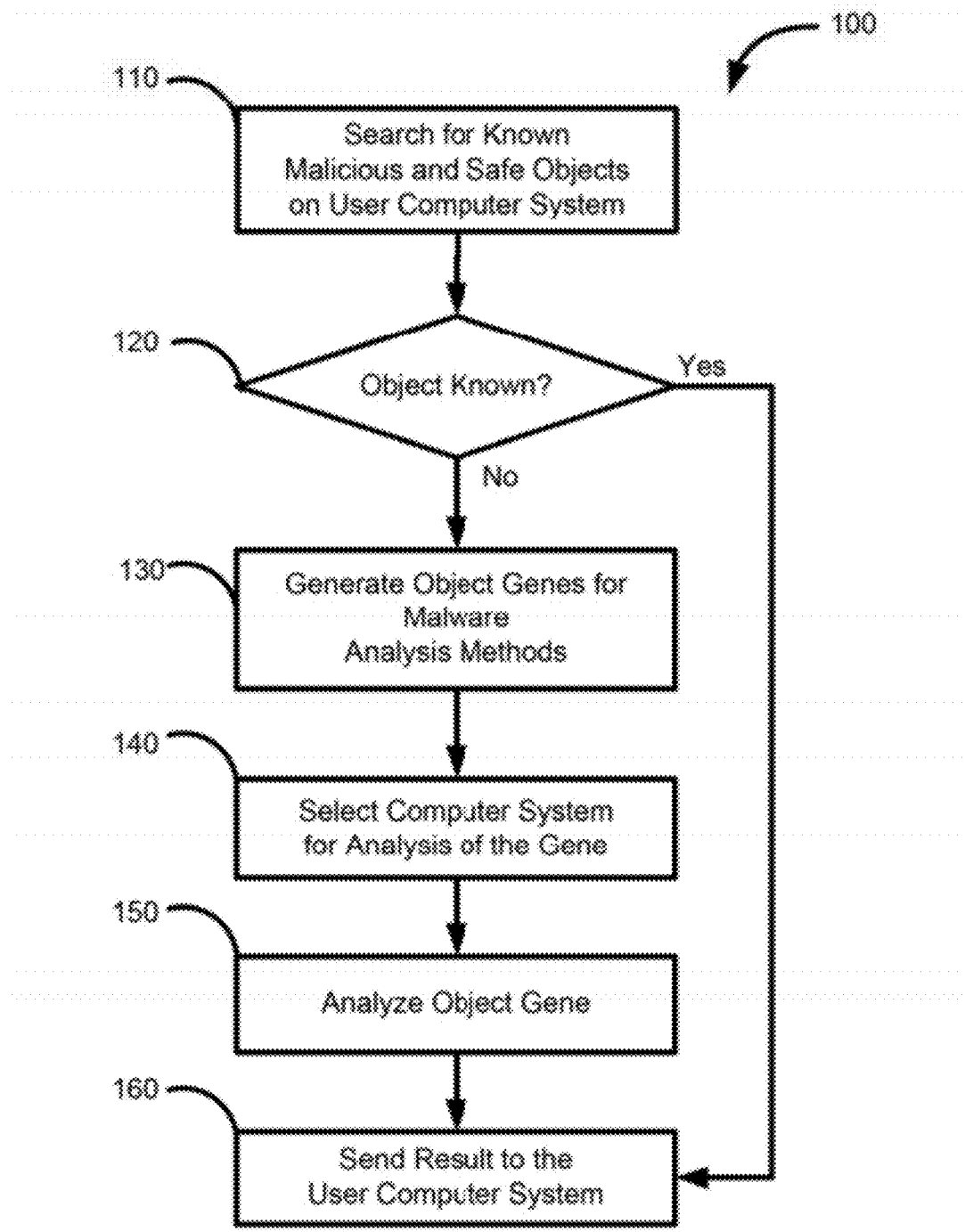
FIG. 1 illustrates a flow diagram of a process for detecting unknown malware according, to one example embodiment.

FIG. 1 illustrates an example method for detecting unknown malware using principles disclosed above. At step 110, the value of a hash function from the object being analyzed may be computed and compared to the values stored in local or remote databases of malicious and clean objects. Here, the mentioned databases can operate under the control of existing known and future database management systems (DBMSs), such as Oracle, MySQL, Microsoft SQL Server, and other. In addition, any known hash functions may be used, including MD5, SHA-1, SHA-2, Skein, and others. At step 110, the identification of known malicious and clean objects at the beginning of the process is preferred in order to minimize the set of all objects that must be further analyzed for presence of malware to include unknown objects only.

Thus, at step 120, if the object is determined as either a known malware or as a clean object, no further analysis of that object is necessary and the process may end. However, if the object is determined to be unknown, the processing passes to step 130, where object genes for one or more malware analysis methods for analyzing the unknown object are generated. Here, the list of different genes can be determined depending on the capabilities and resources of the computer system on which the object will be analyzed and the file type of object being analyzed. The process of selecting, the appropriate genes from the object is shown in more details in FIGS. 2 and 3, which will be discussed herein below. Next at step 140, a computer system capable of analyzing this gene in a most efficient manner is selected based on its characteristics. This computer system may be the same or different from the computer system on which the object was detected. One example embodiment of the method for selecting a computer system for analysis of an object gene is shown in FIG. 4. Next, at step 150, the object gene is analyzed for presence of malware using one or more different selected malware analysis methods described herein. For example, if a behavior pattern analysis method was selected, the behavior pattern gene may be generated and first subjected to an exact match comparison at step 150 with analogous behavior patterns of known malicious objects. However, if no exact match was found, an approximate string matching (also known as fuzzy string searching) may be performed on object gene in accordance with another example embodiment. Because approximate string matching, is rather resource-intensive process, it should be performed only after the exact match analysis has failed to provide conclusive results. In one example embodiment, approximate string, matching involves a non-specific comparison of lines, for example using Levenshtein, Landau-Vishkin or other algorithms. Using the example of a behavior pattern gene, the sequence of lines of code comprising the behavior pattern may be compared with known malicious behavior patterns. The level of similarity between the behavior patterns may be determined on the basis of some given threshold being exceeded.

In one example embodiment, a method for computing similarity disclosed in U.S. Pat. No. 5,440,742 may be used herein or other known methods may be used.

Yet in another example embodiment, the unknown object may be analyzed using security rating, method disclosed in the U.S. Pat. No. 7,530,106, which is incorporated by referenced herein, and on the basis of the assigned security rating a decision can be made whether the object is malicious or clean. Using the example of a behavior pattern gene, the security rating analysis can be performed in the following manner:
- the behavior pattern of an unknown object is divided into several logical blocks;
- the status of each of block is determined;
- the security rating is determined depending on the status and frequency of appearance of each block in the behavior pattern; and
- the security rating for the entire behavior pattern is computed by combining the ratings of all logical blocks.

Each logical block includes a sequence of assembler instructions executable prior to the jump (JMP) instruction (see the description of FIG. 8 below). The status of logical block includes: malicious (found only in the malicious patterns), clean (found only in clean patterns), mixed (found in both malicious and clean patterns), and unknown (a block that is encountered for the first time). The decision whether the object is malicious or not may be made on the basis of the total security rating for the object gene.

Finally, at step 160, once the unknown object has been classified as malicious or clean, the result of the analysis is sent to the user computer on which the object was detected, so that appropriate actions can be taken by the antivirus application deployed on the user computer.

Figure 2:
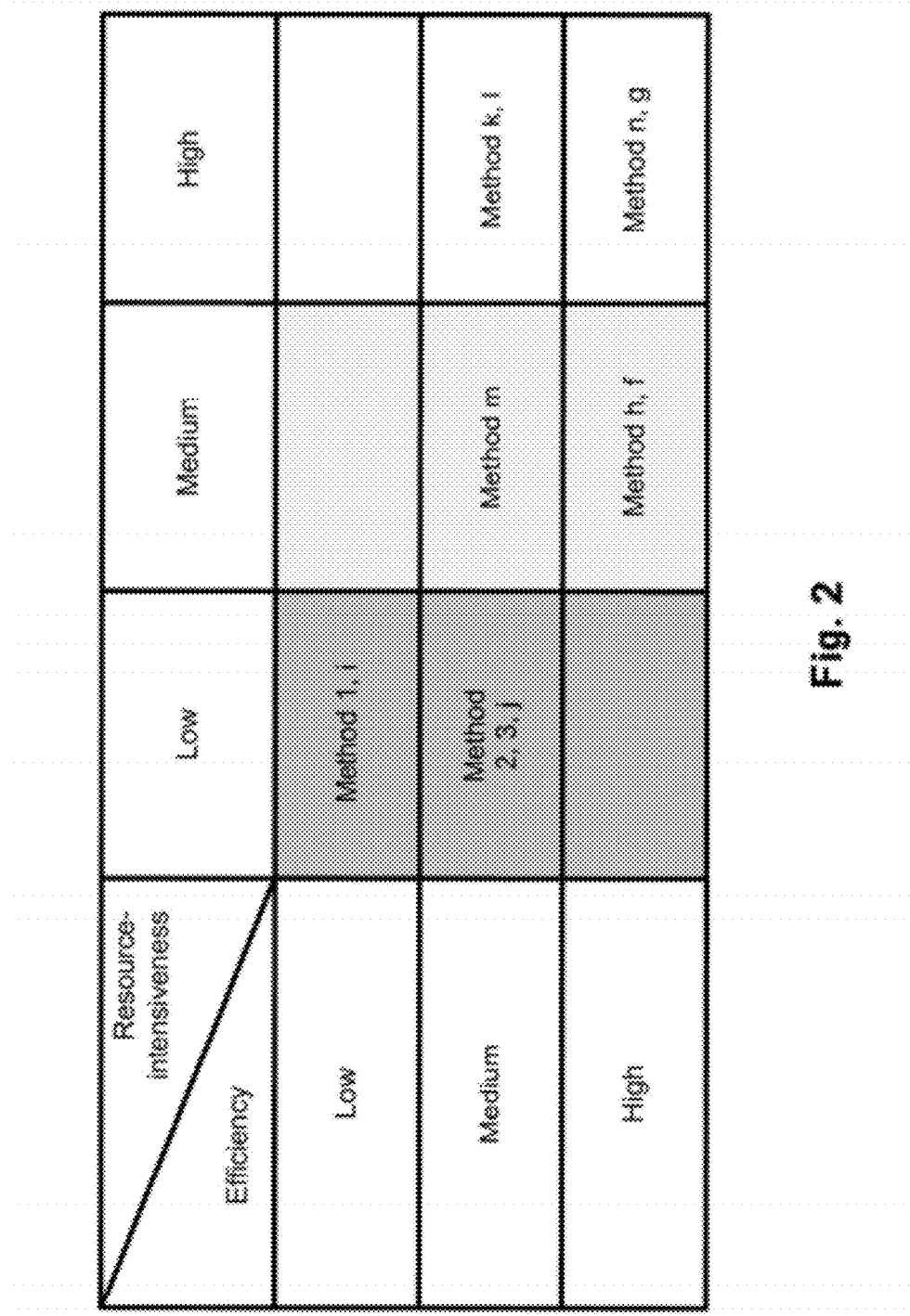
FIG. 2 illustrates a table for selecting malware analysis methods based on minimum time necessary to determine that the object is malicious.

FIG. 2 illustrates one example of a process for selecting relevant genes for malware analysis. In general, the process is based on minimizing the time necessary to determine that the object is malicious. Then, on the basis of the selected, analysis method(s), the appropriate information elements of the object are retrieved from the object to generate all relevant gene(s).

In one example embodiment, analysis method(s) may be selected using fuzzy logic. Two linguistic variables are determined: the effectiveness of the method and the resource intensiveness of obtaining input data for the method, for each of which a term-set is determined, for example {"low", "medium", "high"}. Here, the effectiveness of the methods is reexamined periodically. Then, the ordered list of methods can be divided into categories, depending on the configuration type of the computer system that performs the analysis, e.g. "low-power" "medium", "high-productivity". An example of such an analysis is disclosed in the Russian patent RU98611 "System for improvement performance based on adaptive configuration of conflicting applications", which is incorporated by referenced herein. Thus, based on the selected method(s), an optimal set of genes can be generated, which the user computer system can extract from the object being analyzed and which gives the best results in determining if the object is malicious.

Figure 3:
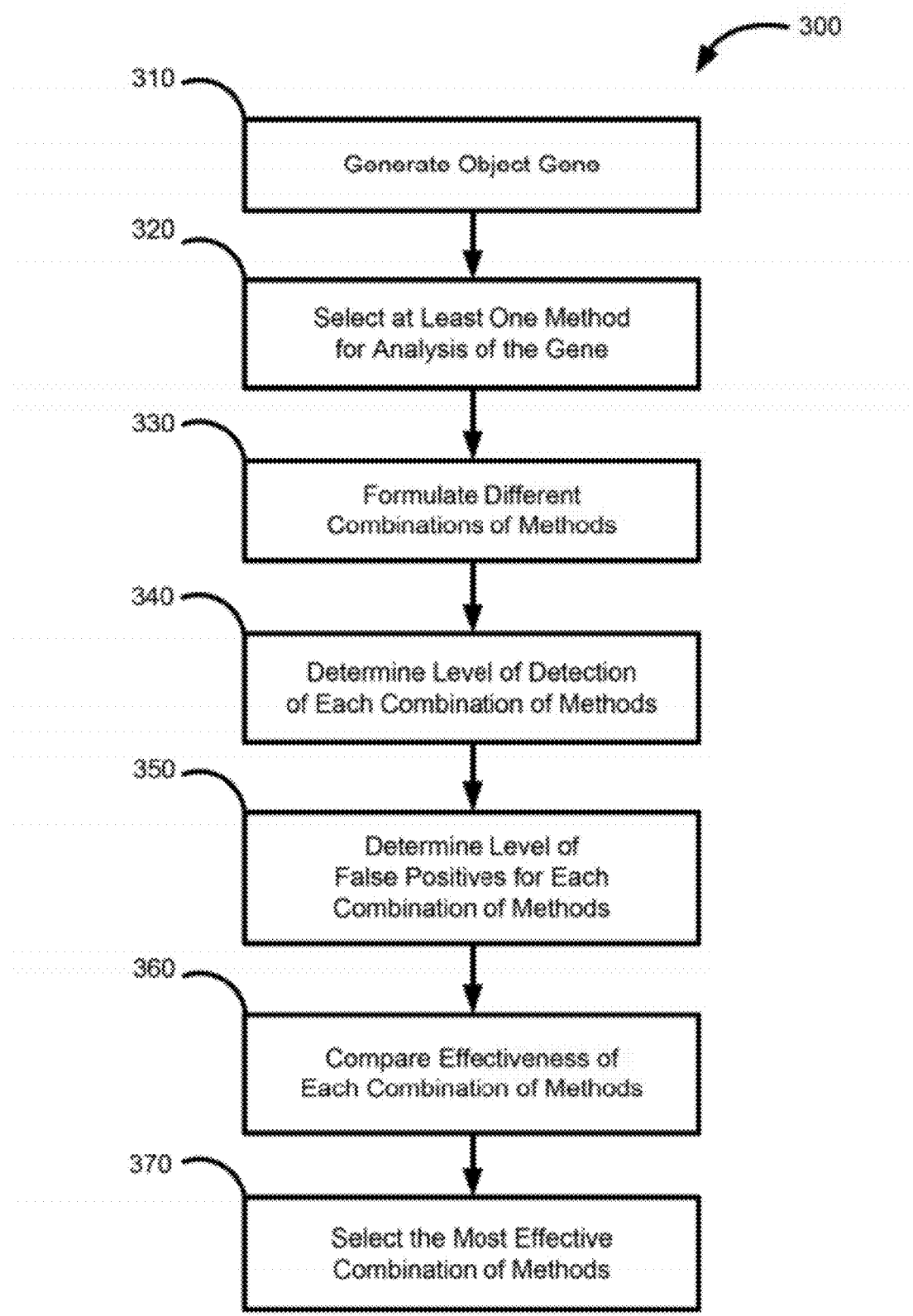
FIG. 3 illustrates a flow diagram of a process for selecting malware analysis methods according to one example embodiment.

FIG. 3 illustrates a process for determining the most effective combination of methods for analyzing unknown objects and their corresponding genes for presence of malware. The combination of methods for analyzing unknown objects will be defined as a set of at least one method for analyzing unknown objects and corresponding genes for the objects. The effectiveness will be defined as the ratio between a level of successful malware detections and a level of false positive detections. The level of successful detection of unknown malware may be calculated as a ratio between the number of detected malicious objects and the total number of malicious objects. The level of false positive detections may be calculated as a ratio between the number of clean objects of that type recognized as malicious and the total number of clean objects of that type.

Figure 14:
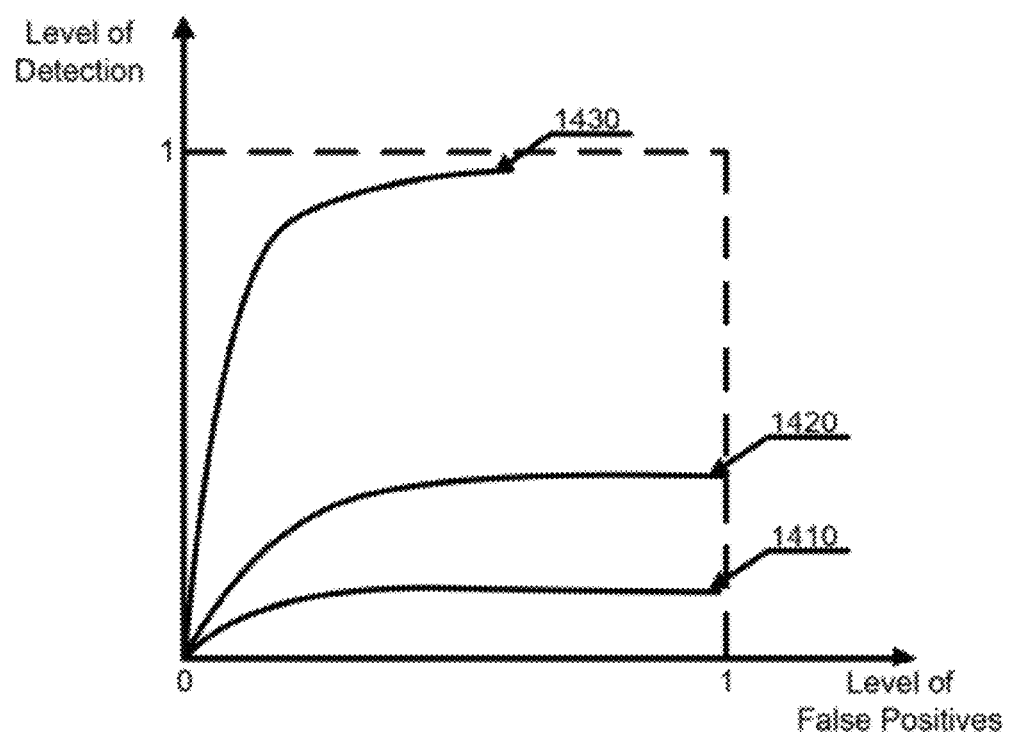
FIG. 14 illustrates an example of the effectiveness ratio of the operation of each method individually and in combination according to one example embodiment.

The use of different combinations of malware analysis methods is preferred because, in some cases, methods that are not the most effective when used individually give the best results when combined. FIG. 14 shows an example in which the use of analysis methods 1410 and 1420 together provides a non-linear increase in the effectiveness of detection of malicious objects as shown by the combined curve 1430.

At step 310 object genes are generated for all objects from the databases of malicious and clean objects. Thereafter, at step 320, at least one method of analysis is selected for each gene. Then, at step 330, at least one combination of methods for analysis of each gene is generated, whose effectiveness of operation is evaluated later. It should be noted that the generated combination may include one or more methods for analysis of a gene. At steps 340 and 350, the level of successful detections and level of false positive detections are determined for each combination of methods in order to measure at step 360 their effectiveness with respect to each type of object. FIG. 12 shows an example chart of effectiveness of different combinations of analysis methods. Then, the effectiveness values of different combinations are compared at step 370, and the most effective combination of methods is selected for analysis of different types of objects. Thus, based on the file type of unknown object being analyzed the most effective combination of analysis methods is selected and only genes associated with the selected method(s) are generated.

It should be noted that the effectiveness of the combinations of malware analysis methods can be periodically reevaluated, which will provide more relevant information on their confidence level and consequently will increase the quality of detection for unknown malware.

Furthermore, with the appearance of unknown genes of different file types, some nominal values of effectiveness for the associated malware analysis methods may be entered into the database. As additional information about the new genes is collected the effectiveness of malware analysis methods used to analyze this type of object can be reevaluated.

Such situations can also arise when new file types appear and when the analysis of existing genes does not give adequate results. This means that a large number of cases exist in which analysis of known genes gives an erroneous result. With the appearance of object of a new file type, the need may arise for generating new types of genes associated with this new file type.

In one example embodiment, the databases containing information about malicious and clean genes may also be subjected to periodic reevaluation. In particular, the scope of coverage of a plurality of malicious programs by individual genes may be reevaluated. Scope of coverage means the percentage of malicious objects which are revealed with the aid of one gene. As it has been pointed out above, the effectiveness of combinations of processing methods can change over time this is also true for the scope of coverage. For the evaluation of such changes, the average scope of coverage of a plurality of malicious objects by genes may be calculated as the arithmetic mean of all scopes of coverage of the specified set of genes. Here, a decrease in the calculated value may evidence a reduction in the effectiveness of the malware analysis methods used in analysis of genes as well as a need to change the rules for adding new genes.

FIG. 4 illustrates an example process of selecting a computer which, based on its characteristics, is capable of processing an object gene. In one example embodiment, information can be stored on a central server for the parameters of computers in the network and the statistics on the time and duration of their operation. For example, the entire set of network computers can be divided into groups based on their productivity level, similarly to the methods disclosed in RU98611, which is incorporated by referenced herein. Furthermore, depending an the resource-intensiveness of the method selected in step 130, the subset of computers with the required characteristics is determined. Then the subset is narrowed down once more by determining the level of network accessibility. Here, the network accessibility is understood to be the period of time the computer remains in the network, its load level, the bandwidth of the communication channels, etc. Here, if the object required could not been found among the users' computers, a remote server of an antivirus company can be used in the role of the analyzing computer. If the number of computers satisfying the specified criteria is large, only some subset of them can be selected. Let us suppose, for example, that it is required to find a computer with average characteristics for analyzing some software object. FIG. 4 shows a set of computers with specified parameters, including computer 2 and computer 3. Here, only one of them, computer 3, has an average level of network accessibility, i.e. the probability of receiving, a response from it is higher than for computer 2. Consequently, in this example, only computer 3 can be selected for analyzing the unknown object gene.

Figure 5:
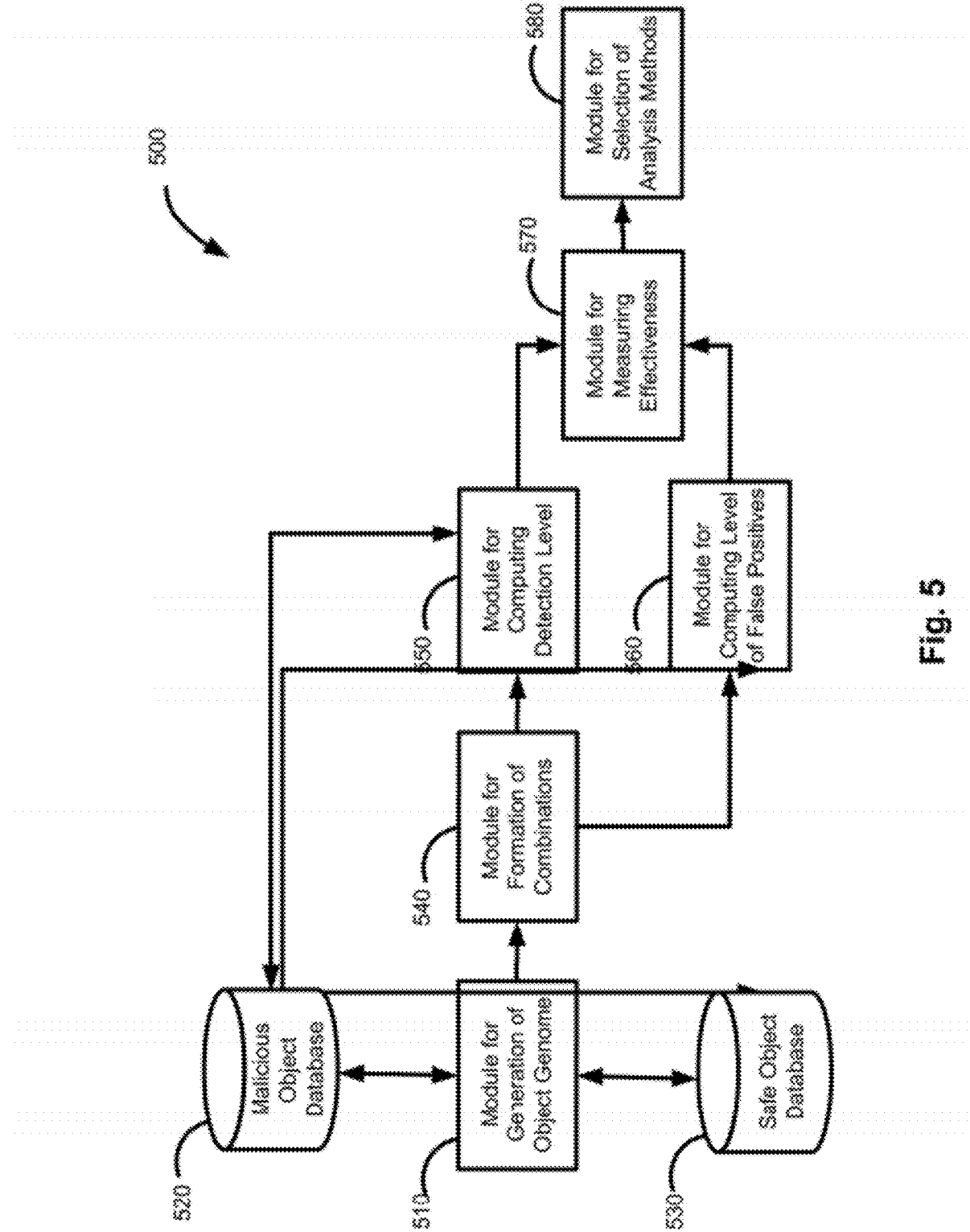
FIG. 5 illustrates a schematic diagram of a system for implementing the method of FIG. 3 according to one example embodiment.

FIG. 5 illustrates example architecture of a computer system for implementing the process 300. The system 500 includes a module 510 for generating different genes of known malicious objects stored in database 520 and known clean objects stored in database 530. System 500 also contains module 540 for forming different combination of malware analysis methods, wherein the possible combination of methods may be represented as a set {Gene1: Method1, Gene2: Method5, Gene7: Method 11, . . . }. The system also includes module 550 for computing the level of successful detections of known malicious objects and module 560 for computing the level of false positive detections of different types of the known malicious and clean objects from databases 520 and 530, respectively. The system 500 also includes module 570 for measuring effectiveness the combinations of malware analysis methods based on data obtained from modules 550 and 560. Furthermore, the system includes module 580 for selecting the most effective combination of malware analysis methods for each file type of software object.

At the first step module 510 generates object genes of all objects from the databases of malicious objects 520 and clean objects 530. Thereafter, the module 540 generates at least one combination of methods for analysis of each gene. It should be noted that the generated combination may include one or more methods for analysis of a gene. If there is only one method for analysis, then the system 500 may not contain the module 540.

The level of successful detections and the level of false positive detections are determined for each combination of methods by module 550 and module 560 accordingly. The module 570 uses these levels to determine the effectiveness of each combination of analysis methods. There are some approaches to select the effectiveness values of different combinations. FIG. 12 shows an example chart of effectiveness of different combinations of analysis methods. The module 580 compares effectiveness values of combinations of methods received from the module 570 and determines the most effective of them. Therefore, the combination of methods determined by module 580 increases the effectiveness of malware analysis in comparison with standalone methods.

In one embodiment the combination of analysis methods may consist of the methods applicable for defined object types only. Also the parts of databases may be used wherein the parts of databases contain malware and clean objects detected during the determined period of time.

In another embodiment of system 500 the object gene consists of one gene only (functionality pattern). Thus, there is only one object gene in the system 500 and the module 510 is similar to that of the U.S. Pat. No. 5,440,742. Thereby, module 510 generates functionality pattern from objects stored in database 520 and known clean objects stored in database 530 in the same manner like in the U.S. Pat. No. 5,440,742. For generated functionality pattern module 540 forms different combinations of malware analysis methods. The effectiveness of methods combinations is evaluated by modules 550 and 560. Based on provided evaluations module 570 measures the effectiveness of the ma ware analysis methods combinations. Then, module 580 selects the most effective combination of malware analysis methods. But as long as there is only one object gene in proposed embodiment the difference between all the combinations is in malware analysis methods only. During the time the effectiveness of the malware analysis methods combinations can be reevaluated.

Tints, based on the file type of unknown object being analyzed the most effective combination of analysis methods is selected and only genes associated with the selected method(s) are generated.

Figure 6:
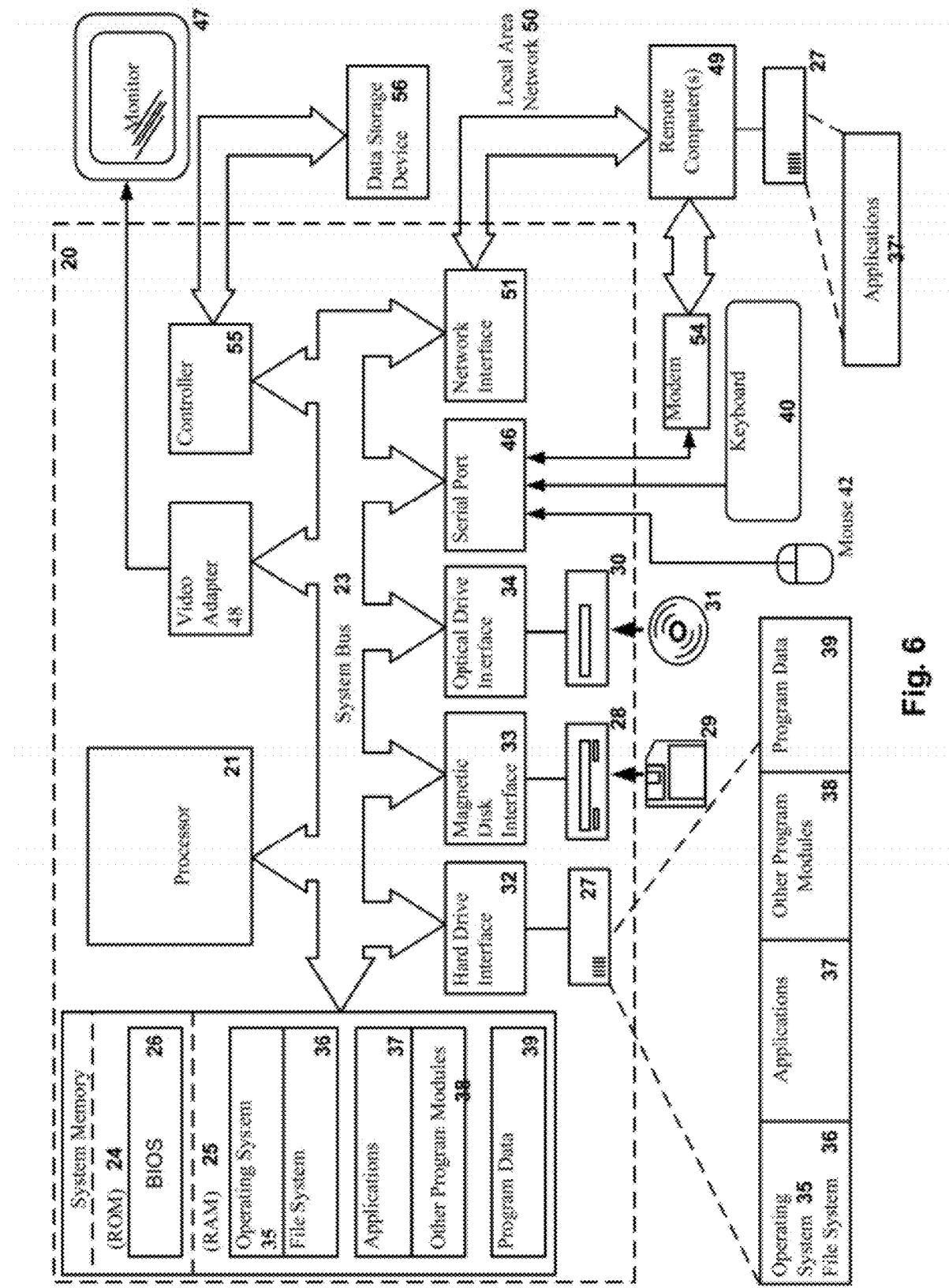
FIG. 6 illustrates a diagram of a general-purpose computer for implementing systems and methods for detection of unknown malware according to disclosed embodiments.

FIG. 6 is a block diagram illustrating an exemplary general-purpose computer system on which one or more functional modules of the system can be implemented. Personal computer or server 20 contains a CPU 21, system memory 22 and system bus 23, which contains various system components, including memory associated with CPU 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input output system (BIOS), containing, the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM. DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (solid state disks, cassette tape, flash drive or other nonvolatile memory, digital disks, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, mouse 42). Other input devices may be (not shown): microphone, joystick, game console, satellite dish, scanner, etc. Such an input device are usually connected to the CPU 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

Personal computer 20 generally operates in a networked environment, using a logical connection to one or more remote computers 49. A remote computer (or computers) 49 can take the form of one or more personal computers, servers, routers, network stations, peering devices or another network host, and usually, have most or all of the elements previously described in the description of the substance of a personal computer 20. Logical connections include a network interface 51 to a LAN 50 or wide area network (WAN).

When using LAN networks, a personal computer 20 is connected to LAN 50 via a network adapter or interface 51. When using the WAN networking, personal computer 20 has a modem 54 or other means of communication with the global computer network, such as the Internet, A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing, devices.

Figure 7:
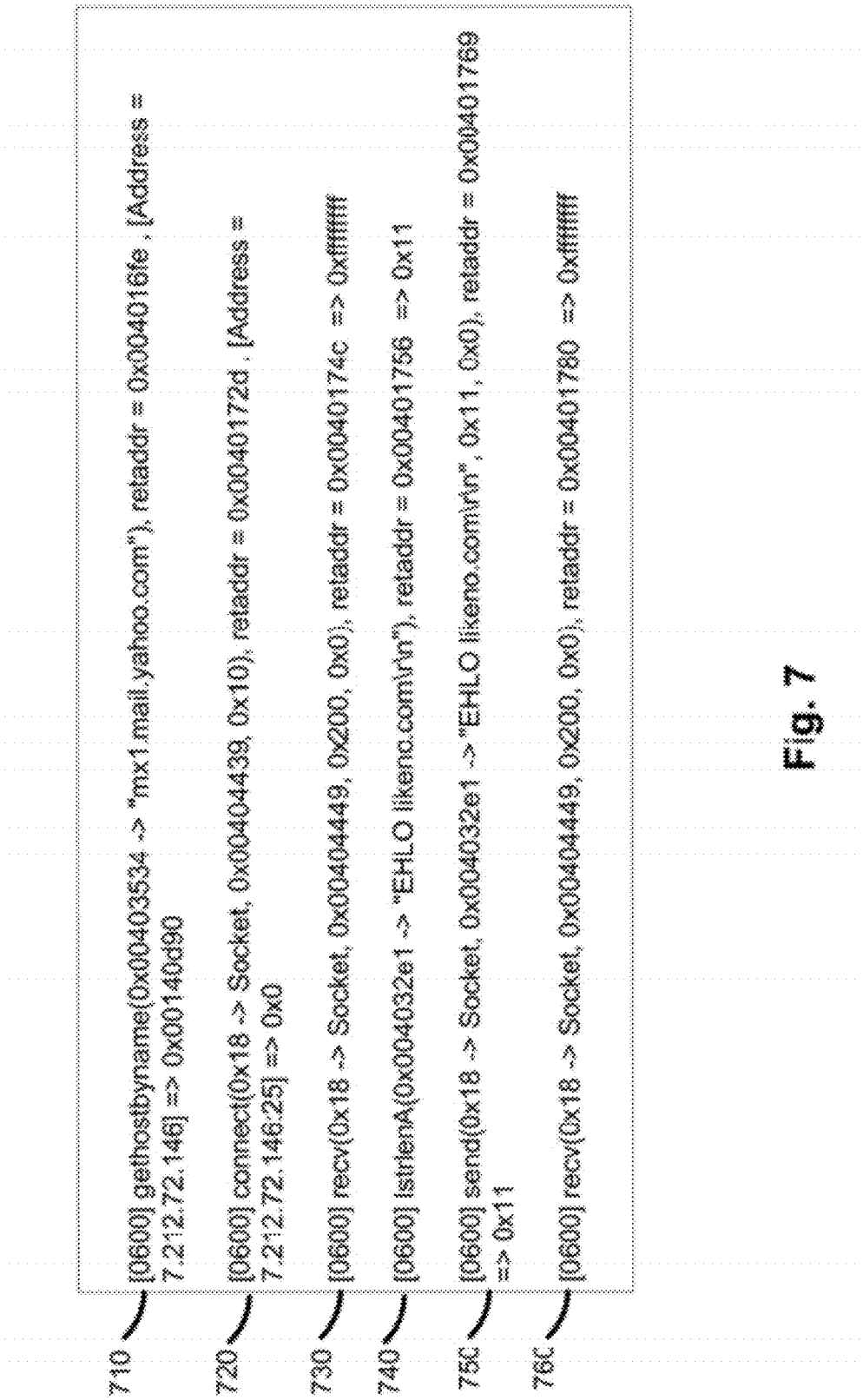
FIG. 7 illustrates an example of an execution path of a warm program.

FIG. 7 illustrates an example of a portion of the execution path gene of a worm program. At stage 710, the network address of the computer system is defined by its name, and the line "mx1.mail.yahoo.com" is transmitted as a parameter. Then, at stage 720, an attempt is made to establish a connection with it, which is completed successfully. After that, the receipt of data 730 is accomplished, and then at stage 740, the length of that data is calculated, which is then sent to stage 750. Thus, it becomes clear from the execution path of the program what functions and with what parameters are being called out during program execution, which turns out to be useful for analysis of maliciousness of the program.

Figure 8:
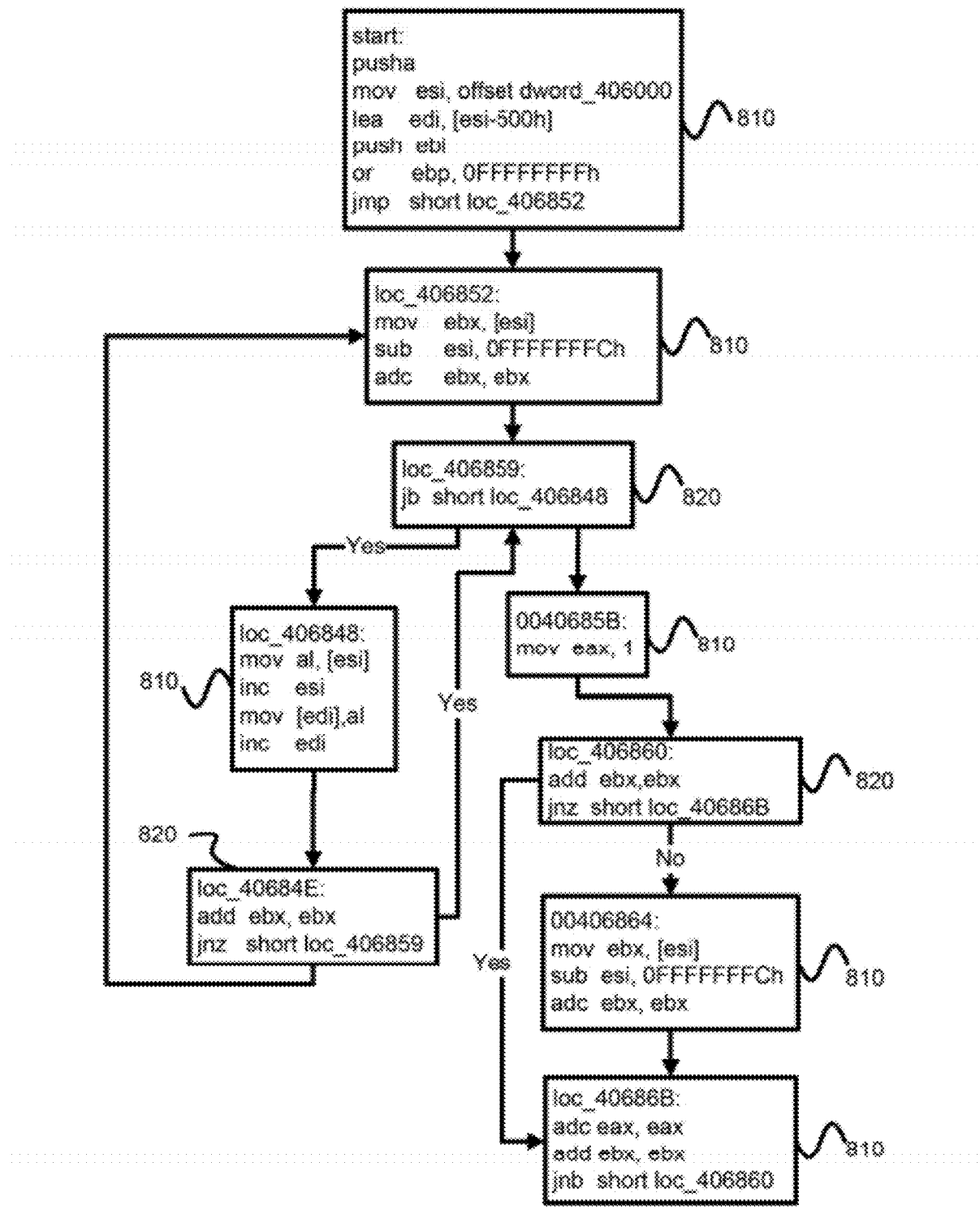
FIG. 8 illustrates an example of a program flowchart for a Trojan-horse program.

FIG. 8 illustrates an example program flowchart gene of a Trojan-horse program. As shown, the vertices are a set of assembler functions executed before JMP instruction. Two vertices are connected by an edge when and only when there is a call from one of them to the other. Here both unconditional 810 and conditional 820 transitions can be noted. For the conditional transition 820, there always exists a certain assumption which is either fulfilled or not. For example, the record "jnz short loc__40686B" means a transition to the area loc__40686B if the value of the flag ZF is different from zero.

Figure 9:
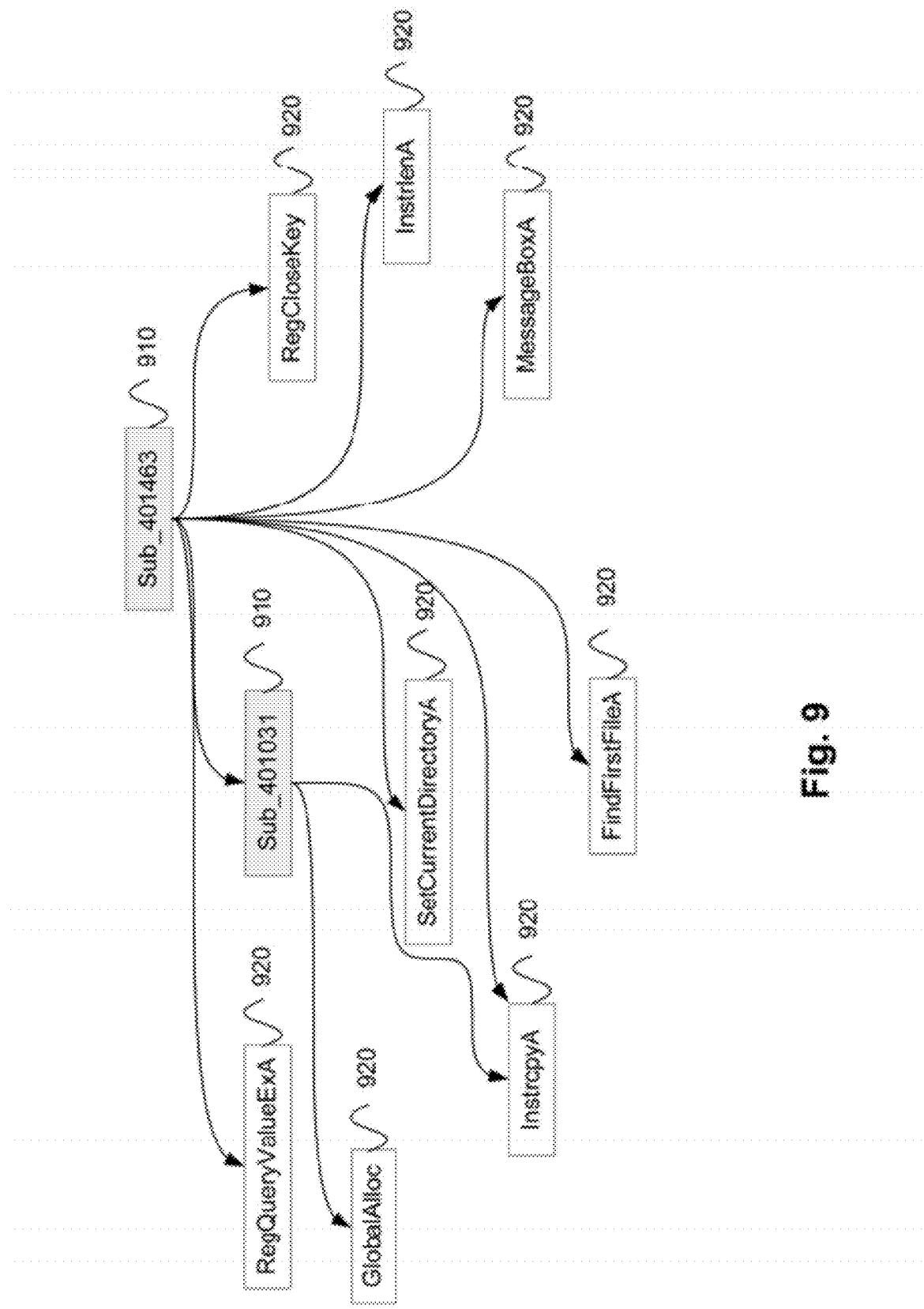
FIG. 9 illustrates an example of a function call-graph for a worm program.

FIG. 9 illustrates a portion of a function call-graph of a worm program. In this case, the vertices are certain procedures or functions of a high-level language, for example "Open file". It is possible to separate from them standard or embedded functions 920, as well as unique ones 910, which were written by the actual programmer for himself. The edge connects two vertices if there is a call from the one function to the other. For example, within the function Sub__401463, the functions RegQueryValueExA, Sub__401031. RegCloseKey, etc. are called out, i.e. there are edges to RegQueryValueExA, Sub__401031 and to RegCloseKey from the vertex Sub__401463.

FIG. 10 illustrates an example operational area gene of an executable file. In one example embodiment, the header, address in random access memory at which the execution of the program starts (the entry point), the pointer to the main function, and the pointer to the end of the execution are selected as the representative information elements of the file for inclusion in the gene. Furthermore, before and after the specified portions, 4 kB each of data are taken, respectively. Thus, 32 kB of information are generated which are stored in random access memory, and further work occurs with it. Such an approach minimizes the time for processing the file, since direct access to the object on the hard drive is a very slow operation in the computer, while operating with the random access memory is substantially faster.

FIG. 11 illustrates a structure of a PDF file. The format being described implies the presence of a header 1110 which starts with '% PDF'. Further, there is a list of the file content 1120 for which is specified, among other things, their number and type, as well as the method with which it was encoded. The end of each object is designated by a special mark. In the cross-reference table 1130, references are indicated to other content within the document, and in the next section 1140, rules are prescribed for decoding this table. Area 1150 shows the end of the document, which is marked with a sequence of '% EOF' symbols.

FIG. 12 illustrates an example of determining the effectiveness of malware analysis methods used in analysis of unknown objects. The effectiveness value is assigned to be between 0 and 1. In one example embodiment, this value can be determined empirically. For example, a set of malicious and clean objects of a specified type is considered and genes required for each element of the set are generated. Then, genes are analyzed using selected methods. Based on the processing results, a decision is made as to whether the object is malicious. Thus, in the last step, we obtain a set X of objects identified as malicious. Then the effectiveness of processing of an unknown object can be calculated from the following formula:

$$k = \begin{cases} \dfrac{|X^b|}{B} \cdot \dfrac{|X^w|}{if} & ec^{\cdot\cdot\cdot} \dfrac{|X^b|}{B} - \dfrac{|X^w|}{W} \geq 0. \\ \text{otherwise} & e, \end{cases}$$

where k is the effectiveness of the method of processing an unknown object, $|X^b|$—the number of malicious objects identified as malicious, $|X^w|$—the number of clean objects identified as malicious, and B and W—the specified numbers of malicious and clean objects, respective y.

As was noted previously, the described process for determining effectiveness of ma ware analysis methods can be executed periodically to generate the most current evaluations.

FIG. 13A illustrates an example of deception by the method of line-by-line comparison of two malicious objects. FIG. 13A shows two sets of code lines of two Trojan-horse programs, which have the same functional, but different file names. Thus, both objects perform similar malicious actions, but when their code lines are compared for exact match, it is determined that practically all lines are different. Thus, if the exact line-by-line comparison does not give a positive result, approximate string matching described above may be used.

FIG. 13B illustrates an example of code obfuscation that prevents detection of a malicious object using analysis of function call-graphs of the program. In the specified list of functions being called, criminals have included dummy code that does not affect the end result of the program. The direct comparison of the provided function call-graphs fails to identify the program as known malware because the function call-graphs are too dissimilar. Therefore such obfuscated instructions make the use of the call-graph analysis difficult for detecting unknown malware, and other malware analysis methods should be used.

FIG. 14 illustrates an example of the operation of combination 1430 of two methods for analysis of genes, 1410 and 1420, respectively. Here the level of successful detection of unknown malicious objects is placed along the ordinate and the level of false positive detections is placed along the abscissa. Thus, malware analysis method 1410 for gene A and malware analysis method 1420 for gene B individually do not have a high effectiveness, but there are situations when the effectiveness of their joint application 1430 significantly exceeds the effectiveness of each of the two methods individually and their combined effectiveness.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting unknown malware, the method comprising:
    generating, by a hardware processor, one or more different object genes for a plurality of known clean objects (W) and known malicious objects (B) of a plurality of different file types, wherein an object gene is a data structure containing a plurality of information elements retrieved from or associated with one or more objects and wherein different object genes contain different types of information elements characteristic of each of the plurality of different file types;

analyzing, by the hardware processor, the one or more different objects genes of the plurality of known clean and malicious objects using one or more malware analysis methods;

determining a level of successful malware detections of known malicious objects $$\left(\frac{|X^b|}{B}\right),$$

wherein $|X^b|$ is the number of known malicious objects (B) identified as malicious, for the plurality of different file types using one or more combinations of malware analysis methods, wherein a combination includes at least two different malware analysis methods;

determining a level of false positive detections of known clean objects $$\left(\frac{|X^w|}{W}\right),$$

wherein $|X^w|$ is the number of known clean objects (W) identified as malicious, for each of the plurality of different file types using said one or more combinations of malware analysis methods;

determining effectiveness (k) of the one or more combinations of malware analysis methods for each of the plurality of different file types using the following equation:

$$k = \begin{cases} \frac{|X^b|}{B} - \frac{|X^w|}{W}, & \text{if } \frac{|X^b|}{B} - \frac{|X^w|}{W} \geq 0, \\ 0, & \text{otherwise} \end{cases}$$

determining a most effective combination of malware analysis methods for each of the plurality of different file types;

selecting, based on a file type of an unknown object, a most effective combination of malware analysis methods, for analyzing the unknown object for presence of malware;

generating one or more different object genes of the unknown object for each of the selected malware analysis methods; and analyzing each one of the generated object genes of the unknown object using the selected most effective combination of malware analysis methods to determine whether the unknown object is clean or malicious.

2. The method of claim 1, further comprising:

determining resource-intensiveness of each selected malware analysis method;

analyzing one of the generated object genes of the unknown object initially using the least resource intensive of the selected malware analysis methods to determine whether the unknown object is clean or malicious; and analyzing one or more of the other generated object genes of the unknown object using more resource intensive of the selected malware analysis methods to determine whether the unknown object is clean or malicious only when the least resource-intensive of the selected malware analysis methods fails to determine if the unknown object is clean or malicious.

3. The method of claim 1, wherein an object gene for each malware analysis method is selected from one of unique lines of code of the unknown object, operational areas of the unknown object, execution path of the unknown object, behavior pattern of the unknown object, program flowchart of the unknown object, or function call graph of the unknown object.

4. The method of claim 1, further comprising selecting out of a plurality of available computers a most efficient computer for analyzing the unknown object for presence of malware.

5. The method of claim 4, wherein the most efficient computer is selected based on one or more of the following factors: productivity of available computers, network accessibility of available computers and resource-intensiveness of the selected malware analysis methods.

6. The method of claim 1, wherein analyzing an object gene using the malware analysis methods further comprises one or more of:

performing a behavior pattern analysis by comparing a behavior pattern gene of the unknown object with behavior patterns known malicious or clean objects;

performing an exact match analysis of a pattern of information elements of the object gene with patterns of information elements associated with known malicious or clean objects;

performing an approximate string matching of the information elements of the object gene with patterns of information elements associated with known malicious or clean objects;

performing a security rating analysis of the information elements of the object gene by separately evaluating maliciousness of separate logical blocks of the information elements.

7. A computer-based system for detecting unknown malware, the system comprising:

a memory configured to store an unknown software object; and a processor coupled to the memory and configured to:

generate one or more different object genes for a plurality of known clean objects (W) and known malicious objects (B) of a plurality of different file types, wherein an object gene is a data structure containing a plurality of information elements retrieved from or associated with one or more objects and wherein different object genes contain different types of information elements characteristic of each of the plurality of different file types;

analyze the one or more different objects genes of the plurality of known clean and malicious objects using one or more malware analysis methods;

determine a level of successful malware detections of known malicious objects $$\left(\frac{|X^b|}{B}\right),$$

wherein $|X^b|$ is the number of known malicious objects (B) identified as malicious, for the plurality of different file types using one or more combinations of malware analysis methods, wherein a combination includes at least two different malware analysis methods;

determine a level of false positive detections of known clean objects $$\left(\frac{|X^w|}{W}\right),$$

wherein $|X^w|$ is the number of known clean objects (W) identified as malicious, for each of the plurality of different file types using said one or more combinations of malware analysis methods;

determine effectiveness (k) of the one or more combinations of malware analysis methods for each of the plurality of different file types using the following equation:

$$k = \begin{cases} \frac{|X^b|}{B} - \frac{|X^w|}{W}, & \text{if } \frac{|X^b|}{B} - \frac{|X^w|}{W} \geq 0, \\ 0, & \text{otherwise} \end{cases}$$

determine a most effective combination of malware analysis methods for each of the plurality of different file types;

select, based on a file type of an unknown object, a most effective combination of malware analysis methods, for analyzing the unknown object for presence of malware;

generate one or more different object genes of the unknown object for each of the selected malware analysis methods; and analyze each one of the generated object genes of the unknown object using the selected most effective combination of malware analysis methods to determine whether the unknown object is clean or malicious.

8. The system of claim 7, wherein the processor is further configured to:

determine resource-intensiveness of each selected malware analysis method;

analyze one of the generated object genes of the unknown object initially using the least resource intensive of the selected malware analysis methods to determine whether the unknown object is clean or malicious; and analyze one or more of the other generated object genes of the unknown object using more resource intensive of the selected malware analysis methods to determine whether the unknown object is clean or malicious only when the least resource-intensive of the selected malware analysis methods fails to determine if the unknown object is clean or malicious.

9. The system of claim 7, wherein the processor is further configured to select out of a plurality of available computers a most efficient computer for analyzing the unknown object for presence of malware.

10. The system of claim 9, wherein the most efficient computer is selected based on one or more of the following factors: productivity of available computers, work accessibility of available computers and resource-intensiveness of the selected malware analysis methods.

11. The system of claim 7, wherein an object gene for each malware analysis method is selected from one of unique lines of code of the unknown object, operational areas of the unknown object, execution path of the unknown object, behavior pattern of the unknown object, program flowchart of the unknown object, or function call graph of the unknown object.

12. The system of claim 7, wherein to analyze an object gene using the malware analysis methods, the processor is further configure to perform one or more of:

a behavior pattern analysis by comparing a behavior pattern gene of the unknown object with behavior patterns known malicious or clean objects;

an exact match analysis of a pattern of information elements of the object gene with patterns of information elements associated with known malicious or clean objects;

an approximate string matching of the information elements of the object gene with patterns of information elements associated with known malicious or clean objects; and a security rating analysis of the information elements of the object gene by separately evaluating maliciousness of separate logical blocks of the information elements.

13. A computer program product embedded in a non-transitory computer-readable storage medium, the computer-readable storage medium comprising computer-executable instructions for detecting unknown malware, the medium comprises instructions for:

generating one or more different object genes for a plurality of known clean objects (W) and known malicious objects (B) of a plurality of different file types, wherein an object gene is a data structure containing a plurality of information elements retrieved from or associated with one or more objects and wherein different object genes contain different types of information elements characteristic of each of the plurality of different file types;

analyzing the one or more different objects genes of the plurality of known clean and malicious objects using one or more malware analysis methods;

determining a level of successful malware detections of known malicious objects $$\left(\frac{|X^b|}{B}\right),$$

wherein $|X^b|$ is the number of known malicious objects (B) identified as malicious, for plurality of different file types using one or more combinations of malware analysis methods, wherein a combination includes at least two different malware analysis methods;

determining a level of false positive detections of known clean objects $$\left(\frac{|X^w|}{W}\right),$$

wherein $|X^w|$ is the number of known clean objects (W) identified as malicious, for each of the plurality of different file types using said one or more combinations of malware analysis methods;

determining effectiveness (k) of the one or more combinations of malware analysis methods for each of the plurality of different file types using the following equation:

$$k = \begin{cases} \frac{|X^b|}{B} - \frac{|X^w|}{W}, & \text{if } \frac{|X^b|}{B} - \frac{|X^w|}{W} \geq 0, \\ 0, & \text{otherwise} \end{cases}$$

determining a most effective combination of malware analysis methods for each of the plurality of different file types;

selecting, based on a file type of an unknown object, a most effective combination of malware analysis methods, for analyzing the unknown object for presence of malware;

generating one or more different object genes of the unknown object for each of the selected malware analysis methods; and analyzing each one of the generated object genes of the unknown object using the selected most effective combination of malware analysis methods to determine whether the unknown object is clean or malicious.

14. The product of claim 13, further comprising instructions for:

determining resource-intensiveness of each selected malware analysis method;

analyzing one of the generated object genes of the unknown object initially using the least resource intensive of the selected malware analysis methods to determine whether the unknown object is clean or malicious; and analyzing one or more of the other generated object genes of the unknown object using more resource intensive of the selected malware analysis methods to determine whether the unknown object is clean or malicious only when the least resource-intensive of the selected malware analysis methods fails to determine if the unknown object is clean or malicious.

15. The product of claim 13, wherein an object gene for each malware analysis method is selected from one of unique lines of code of the unknown object, operational areas of the unknown object, execution path of the unknown object, behavior pattern of the unknown object, program flowchart of the unknown object, or function call graph of the unknown object.

16. The product of claim 13, further comprising instructions for selecting out of a plurality of available computers a most efficient computer for analyzing the unknown object for presence of malware.

17. The product of claim 16, wherein the most efficient computer is selected based on one or more of the following factors: productivity of available computers, network accessibility of available computers and resource-intensiveness of the selected malware analysis methods.

18. The product of claim 13, wherein to analyze an object gene using the malware analysis methods, the processor is further configure to perform one or more of:

a behavior pattern analysis by comparing a behavior pattern gene of the unknown object with behavior patterns known malicious or clean objects;

an exact match analysis of a pattern of information elements of the object gene with patterns of information elements associated with known malicious or clean objects;

an approximate string matching of the information elements of the object gene with patterns of information elements associated with known malicious or clean objects; and a security rating analysis of the information elements of the object gene by separately evaluating maliciousness of separate logical blocks of the information elements.

* * * * *